United States Patent [19]

Butkus et al.

[11] Patent Number: 5,010,046
[45] Date of Patent: Apr. 23, 1991

[54] CHROMIA-MAGNESIA REFRACTORY BODY

[75] Inventors: Anthony K. Butkus, Worcester; Scott D. Martin, Paxton, both of Mass.

[73] Assignee: Norton Company, Worcester, Mass.

[21] Appl. No.: 488,162

[22] Filed: Mar. 5, 1990

Related U.S. Application Data

[63] Continuation-in-part of Ser. No. 327,061, Mar. 22, 1989, abandoned.

[51] Int. Cl.$^5$ ............... C04B 35/04; C04B 35/10; C04B 35/12
[52] U.S. Cl. ............................ 501/117; 501/118
[58] Field of Search ............................ 501/117, 118

[56] References Cited

U.S. PATENT DOCUMENTS 4,435,514 3/1984 Hartline ............................ 501/117

Primary Examiner—Mark L. Bell
Attorney, Agent, or Firm—Arthur A. Loiselle, Jr

[57] ABSTRACT

An improved chromia-magnesia refractory product of co-fused chromia-magnesia grains bonded by an in situ formed chromia bond is prepared by substantially avoiding the presence of grains that will pass through a screen with openings of 150 microns. The resultant product exhibits improved resistance to silicieous materials such as are present in coal slags.

20 Claims, No Drawings

CHROMIA-MAGNESIA REFRACTORY BODY

CROSS-REFERENCE TO RELATED APPLICATION

This application is a continuation-in-part of U.S. Ser. No. 07/327,061, filed Mar. 22, 1989, now abandoned.

TECHNICAL FIELD

This invention relates to chromia-magnesia refractory products which exhibit improved resistance to silica. More specifically, the invention is concerned with refractory articles of chromia bonded co-fused chromia and magnesia.

TECHNICAL BACKGROUND

Co-fused chromia and magnesia refractory bodies bonded with an in situ formed microcrystalline chromia or chromia-magnesia bond are known from U.S. Pat. No. 4,435,514 (Hartline). The bodies are disclosed to have excellent resistance to erosion by molten silica rich slags, particularly Western U.S. coal slag. While these bodies are superior to prior refractory bodies in regard to resistance to siliceous materials, it has been found that under certain circumstances of extended exposure to extremely high siliceous content materials, they still exhibit an amount of deterioration which is considered unsatisfactory. There is therefore a need for chromia-magnesia refractory bodies having an even greater resistance to siliceous materials such as slags than can be obtained by Hartline.

Accordingly, it is an object of the invention to produce co-fused chromia and magnesia bodies having less deterioration in the presence of molten siliceous materials than the co-fused bodies of Hartline.

SUMMARY OF THE INVENTION

It has now been discovered that improved silica resistance can be obtained from co-fused chromia and magnesia bodies by substantially avoiding the presence of co-fused chromia and magnesia particles which are finer than about 150 microns.

DESCRIPTION OF THE PREFERRED EMBODIMENTS

The refractory bodies of this invention comprise co-fused chromia and magnesia grain particles bonded with an in situ formed microcrystalline chromia bond.

The co-fused chromia and magnesia grain particles used herein are generally prepared in any manner known in the art. One suitable such method entails fusion of a mixture of chromia and magnesia, casting into an ingot, and then crushing the ingot to form the grains. Generally, chromia will be present in the grain as about 70 to 90 weight %, with the magnesia at a corresponding about 30 to 10%, though the grain may also contain impurities in amounts up to about 8%, preferably only up to about 5%.

The co-fused grain will normally be used in a mixture of particle sizes to improve the packing density thereof. The maximum size of the grain particles is not critical provided that there is a sufficient mixture of particle sizes so that a dense packed mixture can be formed in which the porosity is less than about 30%, preferably less than about 16%. Generally all of the particles will be fine enough to pass through a 3.5 mesh screen (sieve openings of 5.6 mm). To produce the refractory bodies having improved resistance to siliceous slags, substantially all particles capable of passing through a 100 mesh screen (sieve openings of 150 microns) are removed. The co-fused particles which pass a 100 mesh screen can be readily removed from a mixture of such particles with larger ones by screening or other suitable technique. While the avoidance of all −100 mesh grain particles is preferred to produce the most slag resistant refractory products, a substantial improvement in slag resistance over that obtained by U.S. Pat. No. 4,435,514 occurs when the weight percent of −100 mesh particles is less than about 10% of the total mixture, more preferably less than about 5%, and still more preferably less than about 1%.

Preferably, the co-fused particles will be used in a mixed particle size distribution in which about 20 to 45 weight % will pass 3.5 mesh but not pass 6 mesh (sieve openings 3.35 mm), about 30 to 55 weight % will pass 6 mesh but not pass 45 mesh (sieve openings 328 microns), about 15 to 30 weight % will pass 45 mesh but not pass 100 mesh (sieve openings 150 microns) and only up to about 5 weight % that will pass 100 mesh.

The microcrystalline chromia bond is produced from very fine particles of chromia or a source of chromia. The chromia or a chromia source preferably should have a particle size of about 5 micron or finer, most preferably about 1 micron or less. The chromia needs to be sufficiently fine to readily react with the grains at the firing temperature to which they will be subjected, but not so fine as to be reactive therewith at ambient temperature.

In addition to the co-fused grains and the chromia bond, the refractory body may further contain fine alumina particles in an amount of up to about 5 weight %, preferably up to about 2%.

To prepare the refractory bodies having improved resistance to siliceous slags, the co-fused chromia and magnesia grain particles, the very fine chromia particles, and the optional alumina particles are simply mixed together, formed into the desired shape, and fired at an elevated temperature. Oftentimes the forming will be accomplished by the addition of water, surfactants, temporary binders such as Swift's colloid (animal glue) or a 25% dextrin-water solution, and similar such forming additives which will be removed during the subsequent firing of the green body. Generally, the mixture will contain about 50 to 93 parts by weight of the co-fused grain, about 50 to 7 parts by weight of the very fine chromia particles, up to about 5 parts by weight alumina, and up to about 10 parts by weight forming additives. Preferably, the mixture contains about 60 to 80 parts by weight of the co-fused grain, about 40 to 20 parts by weight of the very fine chromia particles, up to about 2 parts by weight alumina, and about 1 to 8 parts by weight forming additives. Most preferably, the mixture will contain about 65 to 75 parts by weight of the co-fused grain, correspondingly about 35 to 25 parts by weight of the very fine chromia particles, up to about 1 part by weight alumina, and about 2 to 6 parts by weight of forming additives.

While it is not an absolute necessity that the grain and bond materials be highly pure, the quality of the final product is directly related to the degree of impurity. Silica is a particularly undesirable impurity. Thus the final product should be about 92 weight % or more chromia and magnesia, preferably at least about 95%.

The processing or fabrication method used to form the refractory product of the present invention is basically standard procedure well known in the art and, therefore, forms no part of the present invention per se. The green refractory products can be shaped or placed by all of the usual techniques such as pressure molding, casting, tamping, ramming, and the like. The green product is then fired or heat treated in the conventional manner, generally at temperatures up to about 1600° C.

The resultant refractory bodies generally have densities of about 3.7 to about 4.2 g/cc with minimal void spaces. The final product preferably exhibits a theoretical density of about 84% or higher, with no more than about 13% open pores and 3% closed pores. Preferably, the average pore diameter will be less than about 9 microns and no more than about 10% by volume of the pores have diameters above about 20 microns. More preferably, the mean pore diameter is about 5 microns or less.

In the following non-limiting examples, all parts and percents are by weight unless otherwise specified.

EXAMPLE I

A co-fused chromia and magnesia refractory body was prepared by cold pressing the following composition:

| Ingredient | Parts |
| --- | --- |
| Chromia-magnesia (−3.5 + 6) | 23 |
| Chromia-magnesia (−6 + 45) | 30 |
| Chromia-magnesia (−45 + 80) | 17 |
| Alumina | 1 |
| Chromia (−800) | 29 |
| Swift's colloid (animal glue) | 4 |

The alumina was grade A15SG, a "super ground" alumina of Aluminum Company of America. The chromia was extremely fine chromia dust having a particle size finer than 800 mesh.

The above composition was mixed, cold pressed into shape, and then fired at about 1750° C. for 4 hours. The properties of the refractory body thus formed were:

| Property | English Units | Metric Units |
| --- | --- | --- |
| Density | 242.2 #/ft$^3$ | 3.88 g/cc |
| Modulus of Elasticity | 13 × 10$^6$ psi | 90 GPa |
| RT Modulus of Rupture | 2,900 psi | 20 GPa |
| 2642° F. Modulus of Rupture | 2,407 psi | |
| 1450° C. Modulus of Rupture | | 16.6 GPa |
| Cold crushing strength | 12,000 psi | 82.7 MPa |

Standard wet chemical analyses were performed on the refractory body and the composition was: $Cr_2O_3$- 83.55%, MgO - 13.37%, CaO - 0.11%, $Al_2O_3$- 1.61%, $SiO_2$- 0.87%, and $Fe_2O_3$- 0.49%.

To evaluate the resistance to slag of the refractory body, it was subjected to a 6 hour drip slag test at 1550° C. using an artificial western type slag. The test was as detailed in A.S.T.M. C768-85 except that (i) the artificial black mesa slag was used in powder form (rather than a rod) and it "drips" into a reaction crucible where it becomes viscous and then flows onto the sample and (ii) a low oxygen partial pressure of $10^{-4}$ atmospheres was used to increase the severity of the test.

The results showed a silica penetration to a depth of 4.76 mm and no observed surface erosion.

EXAMPLE II

A refractory body is produced by vibrocasting a complex shape from the following composition:

| Ingredient | Parts |
| --- | --- |
| Chromia-magnesia (−3.5 + 6) | 18 |
| Chromia-magnesia (−6 + 45) | 25 |
| Chromia-magnesia (−45 + 80) | 12 |
| Chromia-magnesia (−80 + 100) | 15 |
| Chromia (−800) | 30 |
| Darvan 811-D deflocculant | 0.15 |
| Water | 4.3 |

The pH of the mixture is adjusted to 10–11 before vibrocasting. The defloculant is a conventional sodium acrylate copolymer surfactant from R. T. Vanderbilt Co. The resultant mixture is thixotropic and flows under vibration.

The results of the slag drip test as in Example I are essentially the same.

COMPARATIVE EXAMPLE A

The procedure of Example I was repeated to produce a refractory body, except that the chromia-magnesia particle distribution included particles finer than 100 mesh as taught by U.S. Pat. No. 4,435,514 (Hartline). The specific composition used was:

| Ingredient | Parts |
| --- | --- |
| Chromia-magnesia (−3.5 + 6) | 17.5 |
| Chromia-magnesia (−6 + 45) | 22.4 |
| Chromia-magnesia (−45 + 80) | 14.0 |
| Chromia-magnesia (−80 + 100) | 16.1 |
| Calcined magnesia (−100) | 5.1 |
| Chromia (−800) | 24.9 |
| Swift's colloid | 3.5 |

The resultant refractory body was then subjected to the slag drip test of Example I and the results showed substantial surface erosion by the slag and slag penetration to a depth of about 12.7 mm.

The presence of magnesia in the in situ formed bond is detrimental to the slag resistance of the body, even when no −100 mesh co-fused chromia-magnesia particles are present.

What is claimed is:

1. In a refractory product consisting essentially of grains of co-fused chromia and magnesia bonded with an in situ formed microcrystalline bond of chromia, the improvement consisting essentially of the substantial absence of said grains which can pass though a sieve opening of 150 microns.

2. The refractory product of claim 1 consisting essentially of about 50 to 93 parts by weight co-fused grains and from about 7 to 50 parts by weight bond.

3. The refractory product of claim 2 wherein said co-fused grains consisting essentially of about 70 to about 90% by weight chromia and about 30 to about 10% by weight magnesia.

4. The refractory product of claim 1 wherein said grains have a particle size distribution such that the grains pack to produce a maximum of about 30% pores by volume and wherein the average size of said pores is about 8 microns or less.

5. The refractory product of claim 1 wherein said grains have a particle size distribution of about 20 to 45 weight % passing 3.5 mesh but not 6 mesh, about 30 to 55 weight % passing 6 mesh but not 45 mesh, about 15 to 30 weight % passing 45 mesh but not 100 mesh, and less than about 5 weight % passing 100 mesh.

6. The refractory product of claim 1 wherein said grains are present in an amount of from about 60 to 80% by weight and said bond is present in an amount of from about 40 to 20% by weight.

7. The refractory product of claim 1 wherein said grains are present in an amount of from about 65 to 75% by weight and said bond is present in an amount of from about 35 to 25% by weight.

8. The refractory product of claim 1 further consisting essentially of alumina in an amount of up to about 5%.

9. The refractory product of claim 1 further consisting essentially of alumina in an amount of up to about 2%.

10. The refractory product of claim 1 further consisting essentially of alumina in an amount of up to about 1%.

11. A raw batch refractory mix consisting essentially of grains of co-fused chromia and magnesia and a finely particulate source of chromia, in the absence of more than about 10 weight % of co-fused grains that pass through a sieve opening of 150 microns.

12. The raw batch of claim 11 wherein said grains are present in an amount of from about 50 to 93 parts by weight, said fine chromia source is present in an amount of from about 7 to 50 parts by weight, and alumina is present in an amount up to about 5 parts by weight.

13. The raw batch of claim 12 wherein said grains consist essentially of about 70 to about 90% by weight chromia and about 30 to about 10% by weight magnesia.

14. The raw batch of claim 11 wherein said grains have a particle size distribution of about 20 to 45 weight % passing 3.5 mesh but not 6 mesh, about 30 to 55 weight % passing 6 mesh but not 45 mesh, about 15 to 30 wight % passing 45 mesh but not 100 mesh, and less than about 5 weight % passing 100 mesh.

15. The raw batch of claim 11 wherein said grains are present in an amount of from about 60% to 80% by weight and said fine chromia source is present in an amount from about 40% to 20% by weight.

16. The raw batch of claim 11 wherein said grains are present in amount of from about 65% to 75% by weight and said fine chromia source is present in an amount of from about 35% to 25% by weight.

17. The raw batch of claim 11 further consisting essentially of up to about 10 parts by weight of a forming additive per 100 parts by weight total of said grains, said fine chromia source, and said alumina.

18. The raw batch of claim 11 further consisting essentially of alumina in an amount of up to about 2%.

19. The raw batch of claim 11 further consisting essentially of alumina in an amount of up to about 1%.

20. The raw batch of claim 11 wherein the fine chromia source has an average particle size of about 1 micron or less.

* * * * *